US009167042B1

(12) United States Patent
Ehrhardt et al.

(10) Patent No.: US 9,167,042 B1
(45) Date of Patent: Oct. 20, 2015

(54) MAINTAINING COMMUNICATION CHANNEL FOR DEVICE NOTIFICATIONS (75) Inventors: John R. Ehrhardt, Newcastle, WA (US); Jalaja C. Kurubarahalli, Milpitas, CA (US); Marc Solsona-Palomar, Seattle, WA (US); Deniz Hastorun, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 435 days.

(21) Appl. No.: 13/608,853

(22) Filed: Sep. 10, 2012

(51) Int. Cl.
*H04L 29/08* (2006.01)

(52) U.S. Cl.
CPC .................................. *H04L 67/145* (2013.01)

(58) Field of Classification Search
CPC ....... H04L 43/10; H04L 67/22; H04L 67/142; H04L 67/145
See application file for complete search history.

(56) References Cited

U.S. PATENT DOCUMENTS

| | | | | |
|---|---|---|---|---|
| 7,395,336 | B1 * | 7/2008 | Santharam et al. | 709/227 |
| 2007/0140294 | A1 * | 6/2007 | Takatori et al. | 370/466 |
| 2009/0307715 | A1 * | 12/2009 | Santamaria et al. | 719/318 |
| 2010/0228863 | A1 * | 9/2010 | Kawauchi | 709/227 |
| 2011/0188439 | A1 * | 8/2011 | Mao et al. | 370/312 |
| 2012/0167118 | A1 * | 6/2012 | Pingili et al. | 719/318 |
| 2012/0324041 | A1 * | 12/2012 | Gerber et al. | 709/217 |
| 2013/0179992 | A1 * | 7/2013 | Ziskind et al. | 726/30 |
| 2014/0119195 | A1 * | 5/2014 | Tofighbakhsh et al. | 370/241 |

* cited by examiner

*Primary Examiner* — Gregory Sefcheck
*Assistant Examiner* — Jenkey Van
(74) *Attorney, Agent, or Firm* — Lowenstein Sandler LLP (57) ABSTRACT

A first communication channel is established between a user device and a server using a cellular network. The user device receives a timeout interval for the first communication channel. The user device transmits a packet to maintain the first communication channel when the user device detects that other data is being transmitted using a second communication channel during the timeout interval.

17 Claims, 8 Drawing Sheets

MAINTAINING COMMUNICATION CHANNEL FOR DEVICE NOTIFICATIONS

BACKGROUND

A large and growing population of users enjoys entertainment through the consumption of media items, including electronic media, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), smart phones, portable media players, tablet computers, electronic pads, netbooks, desktop computers, notebook computers, and the like.

These electronic devices often use wireless communication systems (e.g., WiFi communication systems such as 802.11a, 802.11b, 802.11c, 802.11g, 802.11n, 802.11ac etc.) or cellular communication systems (e.g., Long Term Evolution (LTE), LTE Advanced, Worldwide Interoperability for Microwave Access (WiMAX), High Speed Packet Access Plus (HSPA+), code division multiple access (CDMA), Global System for Mobile Communications (GSM) etc.) to download or upload digital media items. An electronic device may maintain a communication channel with a digital content providing system (e.g., one or more server computers which provide digital content to the electronic devices). The digital content providing system may provide digital media items (such as electronic books, digital music, digital videos, news feeds, etc.), software (such as software applications (apps), software updates, etc.), or instructions (e.g., instructions for the electronic device to update a configuration parameter (such as screen brightness, power settings, network settings, etc.) of the electronic device, instructions for the electronic device to notify the user with a message, instructions for the electronic device to perform a particular action, etc.) to the electronic device via the communication channel. The digital content providing system may also use other communication channels or protocols to inform (e.g., notify) an electronic device that digital media items are available for download or that the electronic device should perform one or more actions. For example, the digital content providing system may transmit a short messaging service (SMS) message or a multimedia messaging service (MMS) message to the electronic device.

BRIEF DESCRIPTION OF THE DRAWINGS

Embodiments of the present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

A digital content providing system may notify a user device when digital media items (e.g., electronic books, digital music, etc.) are available for the user device to download. For example, when a user purchases a digital media item (such as an electronic book) from the digital content providing system using a website associated with the digital content providing system, the digital content providing system may automatically notify the user device that the user has purchased the digital media item and that the user device should download (e.g., obtain) the digital media item from a digital content providing server. Sending the notifications to the user device may incur costs and/or may cause the user device to use more battery power. For example, sending a notification that a digital media item is available for download using an SMS message may incur costs because a cellular network service provider (e.g., AT&T®) may charge money for each SMS message. In another example, the user device may use a communication channel between the user device and the digital content providing system in order to receive notifications from the digital content providing system. The user device may periodically send a message or a packet (e.g., send a packet every minute) to the digital content providing system to maintain the communication channel (e.g., to keep the communication channel from timing out or from being closed). Periodically sending the message or the packet may increase the power usage of the device.

Embodiments of the present invention may allow a user device to opportunistically transmit a packet or message (e.g., to transmit the packet or message if there is other data being transmitted or received on other communication channels and/or to refrain from transmitting the packet is there is no other data being transmitted on other communication channel) to maintain a communication channel between the user device and the digital content providing system (or digital content providing server). The communication channel may allow the user device to receive notifications without incurring extra costs (e.g., without being charged for using SMS messages). In addition, transmitting the packet to maintain the communication channel when other communication channels are being used and refraining from transmitting the packet when the other communication channels are not being used allows the user device to use less power.

Embodiments of a method and apparatus are described for a client communication module which may maintain a communication channel between a user device and a server. The client communication module may determine whether the user device is able to communicate with a WiFi network (e.g., an 802.11a network, and 802.11b network, an 802.11c network, an 802.11n network, an 802.11ac network, etc.). If the user device is unable to communicate with the WiFi network, the client communication module may establish a first communication channel with the server using a cellular network (e.g., an LTE network, an HSPA+ network, etc.). The client device may send data indicative of a service provider associated with the cellular network, to the server via the first communication channel. The client communication module may obtain a timeout interval for the first communication channel from the service provider and/or from a digital content providing system (e.g., the digital content providing system may transmit a message with a timeout interval of 15 minutes). The client communication module may determine whether the user device is transmitting or receiving other data (e.g., is using or communicating) on a second communication channel within or during the timeout interval. For example, the client communication module may set a timer to the timeout interval (e.g., set a timer to 15 minutes). The client communication module may determine whether the user device is transmitting or receiving data (e.g., whether the user device is communicating or transferring data) on the second communication channel before the timer expires (e.g., before 15 minutes elapse or before an expiration of the timer). If the user device is transmitting other data, the client communication module may maintain the first communication channel (e.g., prevent the first communication channel from timing out or from being closed) by transmitting a packet (e.g., a keepalive packet to maintain the communication channel or to prevent the channel from timing out) to the server via the first communication channel. The client communication module may also reset the timeout interval (e.g., reset the timer back to 15 minutes) at around the time the client communication module transmits the packet (e.g., slightly before, during, or after the client communication module transmits the keepalive packet). In one embodiment, the client communication module may opportunistically transmit the packet (e.g., transmit the packet in situations which allow the user device to use less power). For example, if the user device transmits the packet (e.g., the keepalive packet) when the user device is transmitting other data on the second channel, this may reduce the power used by the device because packet is being transmitted when the user device is already using power to transmit the other data. This may allow the user device to use less power than if the user device transmitted the packet at a later time.

In one embodiment, a keepalive packet may be any message, signal, packet of data, and/or segment of data, which prevents a communication channel from being closed, terminated, and/or timing out. For example, the keepalive packet may be an empty message (e.g., a message with no content) sent to a server (such as a digital content providing server) to indicate that a communication channel is still in use and that the communication should not timeout, close and/or terminate.

In some embodiments, a server includes a server communication module which may maintain a communication channel between a user device and a server. The server communication module may receive a request from a user device to establish a first communication channel. The server may be a notification server that provides or sends notifications, messages, updates, and/or other information to the user device. The server communication module may determine a timeout interval for the first communication channel and may transmit data indicative of the timeout interval to the user device. The timeout interval may be based on network statistics (e.g., data) received from multiple user devices. The network statistics may indicate periods of inactivity and may indicate whether communication channels that were previously used by the multiple user devices timed out during the periods of inactivity. The server may provide digital media items (e.g., electronic books, digital music, digital videos, digital images, etc.) or may provide instructions (e.g., an action item list) to the user device using the first communication channel. The server communication module may maintain the first communication channel (e.g., may not close or terminate the first communication channel) if a packet (e.g., a keepalive packet) is received from the user device within or during the timeout interval. In one embodiment, maintaining the first communication channel may allow the server communication module to transmit notifications and/or action item lists (e.g., a list of digital media items to download) to the user device without incurring extra costs (e.g., using SMS or MMS messages to send notifications to the user device may cost money). In another embodiment, maintaining the first communication channel by opportunistically transmitting a packet (e.g., transmitting the packet when a user device is already using power and transmitting other data on another communication channel) may also allow the user device to conserve power and/or use less power (e.g., allows the user device to save battery power).

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Figure 1:
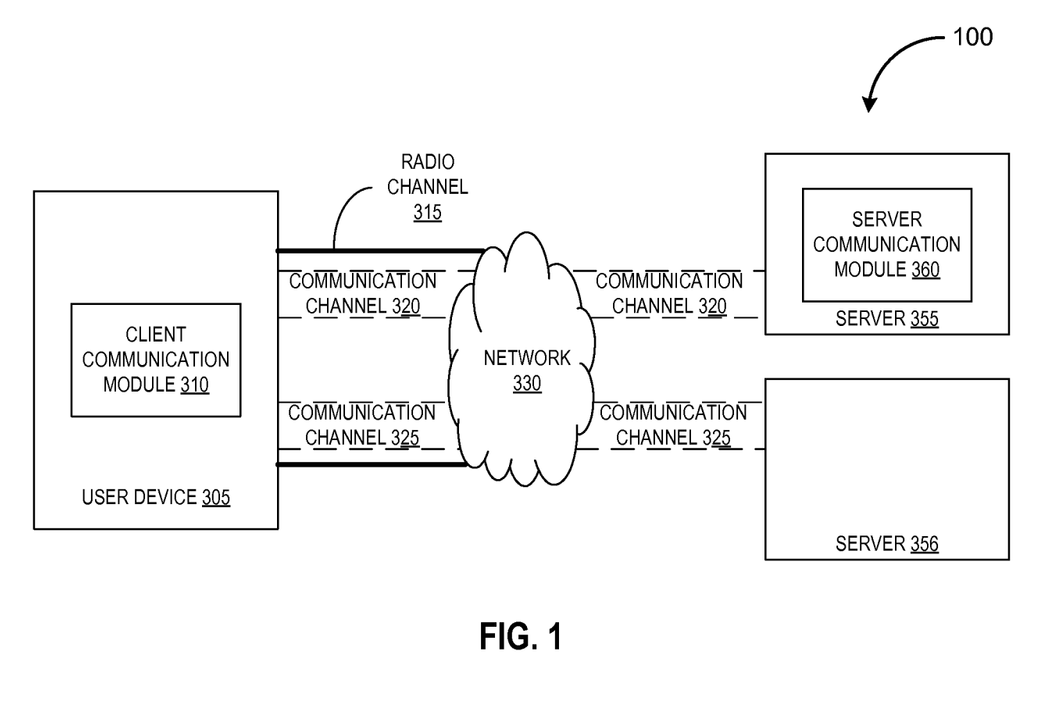
FIG. 1 is a block diagram of an exemplary network architecture, in which embodiments of the present disclosure may operate.

FIG. 1 is a block diagram of an exemplary network architecture 100, in which embodiments of the present invention may operate. The network architecture 100 includes a user device 305, a radio channel 315, a first communication channel 320, a second communication channel 325, a network 330, a server 355, and a server 356. The user device 305 includes a client communication module 310. The server 355 includes a server communication module 360. The network 330 may be a cellular communication network (e.g., an LTE network, an HSPA+ network, a CDMA network, etc.). The server 355 may be a digital content providing server (e.g., digital content providing server 125 of FIG. 2) or may be part of a digital content providing system (digital content providing system 120 of FIG. 2) and it may allow the user device 305 to download content subscribed or purchased by the user (e.g., e-books, movies, etc.). In one embodiment, the server 355 may be a notification server that provides notifications, updates, message, and/or other information to the user device 305. The server 356 may be a server separate from the digital content providing system and it may be accessed by the user of the user device 306 to browse the Internet or perform other similar online activities. For example, the server 356 may be a content server that hosts a website/webpage or hosts digital media items (e.g., streaming videos) that a user may browse.

As shown in FIG. 1, the first communication channel 320 and the second communication channel 325 connect the user device 305 to the servers 355 and 356 via the network 330. The first communication channel 320 connects the user device 305 to the server 355 and the second communication channel 325 connects the user device 305 to the server 356. The first communication channel 320 and the second communication channel 325 may both use the radio channel 315. In one embodiment radio channel 315 may be a cellular communication channel. For example, the radio channel 315 may be a multiple input multiple output (MIMO) communication channel such as an LTE radio channel, an HSPA+ radio channel, etc. Although the radio channel 315 is illustrated as one channel, it should be understood that a MIMO communication may use multiple radio links (e.g., multiple wireless signals). For example, the user device 305 may include multiple antennas, and each of the multiple antennas may be used form a radio link with another device (e.g., a cell tower, a NodeB, another user device). The communication channels 320 and 325 may use these radio links to communicate with the servers 355 and 356. The radio channel 315 may use a cellular network that is operated and/or owned by a service provider (e.g., AT&T®, T-Mobile®, Verizon®, etc.).

In one embodiment, the communication channels 320 and 325 may be logical communication channels. A logical communication channel may be a communication channel that is used to communicate data (e.g., blocks of data, messages, etc.) between two endpoints (e.g., a client and a server, two different clients, two different servers, etc.). The logical communication channel may use one or more of physical communication channels (e.g., a radio channel, an Ethernet wire), routers, switches, ports (e.g., network ports, such as transmission control protocol (TCP) ports or user datagram protocol (UDP) ports), servers, networks, computing devices, connections, and/or other components to communicate data. For example, the communication channel 320 uses the radio channel 315 to provide the data to the network 330. The network 330 may include one or more routers, switches, servers, or ports that are used by the communication channel 320 to route the data to server 355.

In one embodiment, the client communication module 310 may establish the communication channel 320 in order to receive information, notifications, and/or updates from the server 355. The communication channel 320 may close after a certain time period of inactivity. For example, the communication channel 320 may close after 10 minutes if no data is sent or received on the communication channel 320. The client communication module 310 may obtain the timeout interval (e.g., the amount of time before a communication channel closes due to inactivity) after the communication channel 320 is established. The client communication module 310 may determine whether the user device 305 is transmitting or receiving data on the communication channel 325 (e.g., using the communication channel 325) within or during the timeout interval. For example, the client communication module 310 may set a timer to the timeout interval (e.g., set a timer to 15 minutes, 30 minutes, etc.) and start the timer. In one embodiment, a service provider for the cellular network used by the radio channel 315 may close the communication channel 320 after the period of inactivity (e.g., 10 minutes). For example, the service provider may close a port that is used by the communication channel 320. In another example, the service provider may de-allocate a resource (e.g., remove the resource or assign the resource to another logical channel) that is used by the communication channel. This may cause the communication channel 320 to close, because data can no longer be routed between the user device 305 and the server 355.

The client communication module 310 may determine whether the user device is using the communication channel 325 before the timer expires (e.g., before an expiration of the time). If the user device is using the communication channel 325 before the timer expires, the client communication module 310 may maintain the communication channel 320 (e.g., prevent the communication channel 320 from timing out or closing) by transmitting a packet (e.g., a keepalive packet) to the server 355. This may allow the client communication module 310 to transmit the packet opportunistically. For example, the client communication module 310 may take advantage of the situation where the user device is already using battery power to transmit or receive data on communication channel 325 and may transmit the packet (e.g., the keepalive packet) at around the same time period. Sending the packet at around the same time that the user device 305 is transmitting or receiving other data on the communication channel 325 may allow the user device 305 to conserve battery power because the user device 305 is already using battery power to transmit or receive the other data on the communication channel 325. This may also allow the user device to reduce the use of other communication protocols (e.g., SMS message or MMS messages), which may be more costly.

As discussed above, the communication channel 320 may be used to receive a notification from the server 355. In one embodiment, the notification may include an indication to the user device, that the user device should download an action item list (e.g., a list of subscribed digital media items and/or software for the user device to download or a list of actions or tasks for the user device to perform, such as updating a configuration or setting on the user device, deleting data from the user device, adding data to the user device, etc.). The client communication module 310 may download the action item list from the server 355 via the communication channel 320, based on the notification. The client communication module 310 may perform one or more actions on the action item list (e.g., may download a digital media item or software, or may perform an action or task indicated in the action item list).

Figure 2:
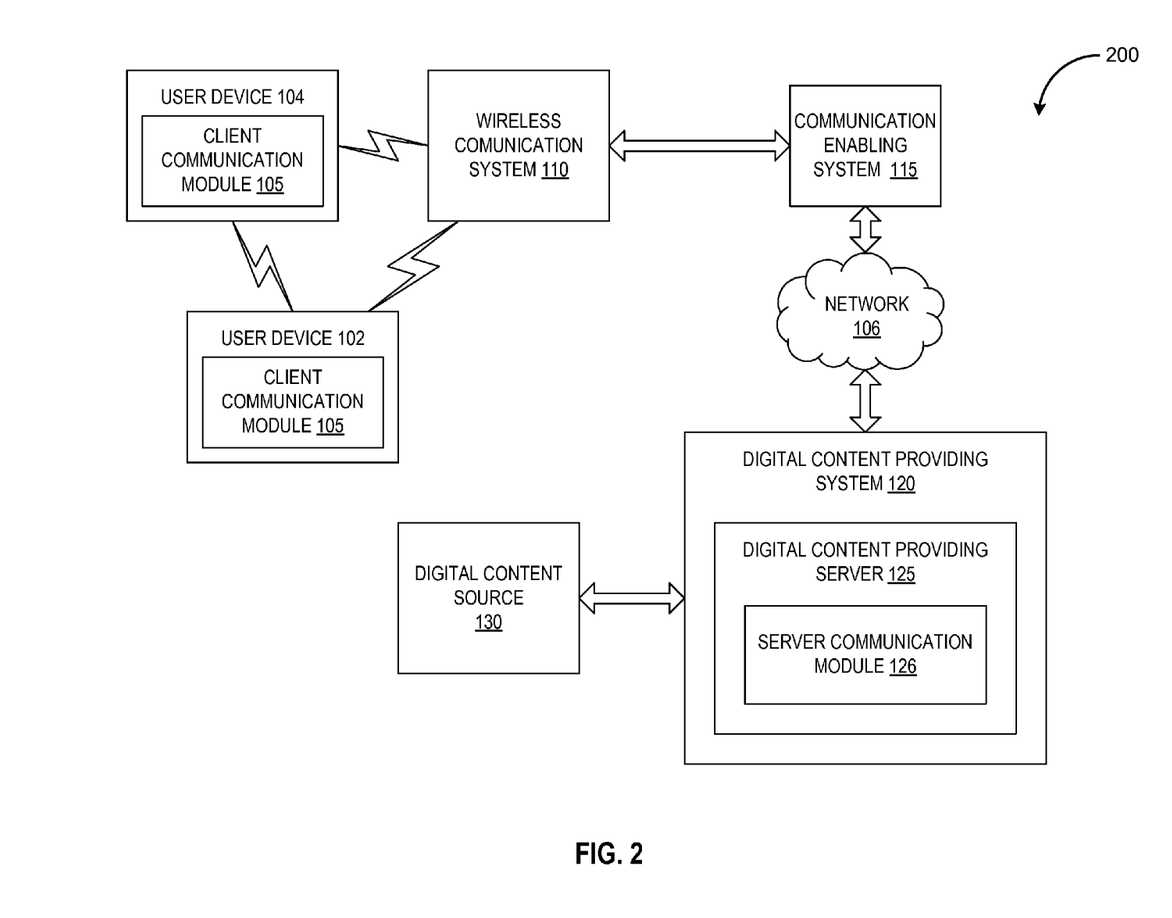
FIG. 2 is a block diagram of a second exemplary network architecture, in which embodiments of the present disclosure may operate.

FIG. 2 is a block diagram of a second exemplary network architecture 200, in which embodiments of the present disclosure described herein may operate. The network architecture 200 may include a digital content providing system 120 and one or more user devices (e.g., electronic devices) 102, 104 capable of communicating with the digital content providing system 120 via a network 106. Network 106 may include, for example, any combination of a public network such as the Internet, a wireless network (e.g., an 802.11n network, an 802.11a network, etc.), a cellular network (e.g., an LTE network, a CDMA network, etc.) and a private network such as a local area network (LAN).

The user devices 102, 104 may be portable computing devices such as electronic book readers or tablet computers (e.g., that include a book reader application). Other examples of portable computing devices include cellular telephones, smart phones, personal digital assistants (PDAs), portable media players, netbooks, laptop computers, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), audio files, and multi-media content.

The digital content providing system 120 may provide electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic media items (e.g., electronic books, digital video, digital audio, etc.) to users upon the users' purchase of the items. In this role, the digital content providing server 125 may essentially act as a bookseller or the like. In other cases, the digital content providing server 125 corresponds to an entity which provides electronic media items to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic media items (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a local area network (LAN), a wide area network (WAN), and wireless infrastructure, which allows a user to use the user devices 102, 104 to purchase digital content (e.g., electronic media items) and consume the digital content without being tethered to the digital content providing system 120 via hardwired links. The wireless infrastructure may be provided by one or multiple wireless communications systems, such as wireless communication system 110. The wireless infrastructure may be provided by one or multiple wireless communications systems, such as wireless communication system 110. In one embodiment, wireless communication system 110 may be a wireless fidelity (WiFi) hotspot connected with the network 106. For example, the wireless communication system 110 may use an 802.11a, 802.11b, 802.11c, 802.11g, 802.11n, or 802.11ac communication protocol. In another embodiment, wireless communication system may be a cellular communication system (e.g., an LTE system, a CDMA system, and HSPA+ system etc.). In a further embodiment, the wireless communication system 110 may use any number or combination of wireless communication protocols. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, cellular communication protocols (e.g., LTE, HSPA+, etc.), or other wireless communication protocols.

The user device 104 may include a client communication module 105. In one embodiment, the client communication module 105 may determine whether the user device 105 is able to communicate with a WiFi network (e.g., communicate with an 802.11g network or system, communicate with an 802.11n network or system, etc.). If the user device 104 is able to communicate with the WiFi network, the user device 104 may communicate with the digital content providing system 120 in order to reduce costs and battery usage when receiving digital media items from digital content providing system. For example, using a WiFi network (e.g., 802.11g or 802.11g) instead of a cellular network (e.g., LTE) may reduce the amount of power (e.g., battery power) used by the user device 104 because transmitting and/or receiving WiFi radio signals may use less power then transmitting and/or receiving cellular radio signals. In another example, using a WiFi network may reduce the costs (e.g., monetary costs) of communicating with the digital content providing system 120 because service providers for cellular networks (e.g., Verizon®, AT&T®, T-Mobile®, Sprint®, Vodafone®, Virgin Mobile®, O2®, etc.) may charge money for the use of the cellular networks. In a further example, using a WiFi network may allow the user device 104 to establish a communication channel with the digital content providing system 120 to receive notifications about digital media items or actions to be performed, rather than using SMS messages or MMS messages (which may cost money) to receive such notifications.

In one embodiment, if the client communication module 105 is unable to communicate with a WiFi network or system, the client communication module 105 may establish a first communication channel with the digital content providing system 120 (e.g., with digital content providing server 125 or another server) using a cellular network (e.g., using LTE or HSPA+). For example, the client communication module 105 may establish a connection with the digital content providing system 120 or digital content providing server 125 using the user datagram packet (UDP) protocol (e.g., client communication module 105 may connect to a UDP port or may open a UDP port, on the digital content providing system 120 or digital content providing server 125). The client communication module 105 may identify a service provider associated with the cellular network and may send data indicative of the service provider to the digital content providing system 120 (or digital content providing server 125). For example, the client communication module 105 may determine that the service provider for a cellular network is Verizon® and may send data indicating that the service provider is Verizon® to the digital content providing system 120.

In one embodiment, the client communication module 105 may obtain a timeout interval for the first communication channel. The timeout interval may be received from the digital content providing system 120 (or digital content providing server 125). The timeout interval may be based on the data indicative of the service provider (e.g., digital content providing system 120 or digital content providing server may provide the timeout interval to the client communication module 105 based on the service provider). The timeout interval may be indicative of an amount of time before the first communication channel will timeout (e.g., will terminate or close), if no data is transmitted or received on the first communication channel (e.g., if there is no activity on the first communication channel). For example, a timeout interval of 15 minutes may indicate that if no data is transmitted or received on the first communication channel in the last 15 minutes, the first communication should be closed or terminated. In one embodiment, the timeout interval may be based on the data indicative of the service provider associated with the cellular network.

In one embodiment, the client communication module 105 may determine whether the user device 104 is transmitting or receiving data (e.g., using, communicating, or transferring data) on a second communication channel within or during the timeout interval. For example, the client communication module 105 may determine whether the user device 104 is transmitting data to a server, other than the digital content providing server 125, due to user activity such as accessing the internet (e.g., user is browsing the Web), checking email (e.g., user is checking email), accessing a website, accessing a news or a blog, etc. If the user device 104 is transmitting or receiving data on a second communication channel (e.g., is transmitting or receiving data from another server or network location) within or during the timeout interval (e.g., within the last 15 minutes, 30 minutes, etc.), the user device 104 may maintain the first communication channel by transmitting a packet (e.g., a keepalive packet) to the digital content providing system 120 or digital content providing server 125 via the first communication channel. This may allow the client communication module 105 to transmit the packet opportunistically. For example, the client communication module 105 may take advantage of the situation where the user device is already using battery power to transmit or receive data on another communication channel and may transmit the packet (e.g., the keepalive packet) at around the same time period. In another embodiment, the client communication module 105 may transmit the packet when the user device 104 is transmitting or receiving data (e.g., communicating data or transferring data) on the second communication channel within a threshold of the expiration of the timeout interval (e.g., expiration of the timer). For example, if the timeout interval is 15 minutes and the threshold is 5 minutes, the client communication module 105 may transmit the packet when the user device is transmitting or receiving data on the second communication channel within the last 5 minutes of the 15 minute timeout interval (e.g., within the last 5 minutes of the timer).

In one embodiment, the client communication module 105 may close or terminate the first communication channel if no data is transmitted or received on the first communication channel within or during the timeout interval. For example, if the timeout interval for the first communication channel is 30 minutes, the client communication module 105 may close or terminate the first communication channel if no data is transmitted or received using the first communication channel for 30 minutes or more.

In one embodiment, the client communication module 105 may conserve power on the user device 105 by sending the packet (e.g., the keepalive packet) when there is already data being sent or received (e.g., being transferred or communicated) on the second communication channel. For example, if the user device 104 is already sending or receiving data via the second communication channel, the user device 104 is already using battery power to transmit or receive the data. Sending the packet at around the same time interval that the user device 104 is transmitting or receiving other data (e.g., communicating data or transferring data) on the second communication channel will cause the user device 104 to avoid using additional battery power to send the packet at a later time because the user device 104 is already using battery power to transmit or receive the other data on the second communication channel. This may allow the client communication module 105 to opportunistically transmit the packet (e.g., the keepalive packet) to maintain the first communication channel with the server by taking advantage of the situation where the user device 104 is already transmitting or receiving other data using the second communication channel (e.g., the user device 104 is already using power or using a wireless modem to transmit or receive the other data).

In one embodiment, transmitting or sending the packet before the timeout interval for the first communication channel is reached or expires may help prevent the first communication channel from being closed or terminated (e.g., may maintain the first communication channel). This allows the digital content providing system 120 or digital content providing server 125 to continue providing notifications to the user device 104 using the first communication channel, instead of using other communication protocols such as SMS message or MMS messages, which may be more costly. In one embodiment, the notification may include an indication to the user device, that the user device should download an action item list (e.g., a list of digital media items and/or software for the user device to download, a list of tasks or actions for the user device to perform). In another embodiment, the notification may include the action item list so that the user device does not need to download the action item list separately.

In one embodiment, when the client communication module 105 receives a notification of an action item list from the digital content provider server 125 or the digital content providing system 120, the client communication module 105 may download the action item list from the digital content providing system 120 or the digital content providing server 125 via the first communication channel, based on the notification. The action item list may include a list of digital media items which are available for the user device 104 to download, a list of software for the user device to download, and/or a list of actions or tasks to be performed by the user device (e.g., to change a setting or to update a piece of software). The client communication module 105 may perform one or more actions on the action item list (e.g., may download a digital media item or software, or may perform an action or task indicated in the action item list).

The digital content providing server 125 may include a server communication module 126. In one embodiment, the server communication module 126 may receive a request to establish a communication channel from the user device 104. For example, the user device may request to connect to a UDP port on the digital content providing server 125. The server communication module 126 may establish the communication channel with the user device 104 based on the request. The server communication module 126 may receive data indicative of a service provider associated with a cellular network used by the user device 104 (e.g., may receive data indicating that AT&T® is associated with the cellular network used by the user device 104).

In one embodiment, the server communication module 126 may determine a timeout interval for the communication channel based on the data indicative of the service provider received from the user device 104. The server communication module 126 may, for example, access a table (e.g., a list of service providers and corresponding timeout intervals) on a storage, memory, etc., to determine the appropriate timeout interval based on the service provider. For example, the server communication module may determine that for the service provider AT&T®, the timeout interval for the communication channel should be 10 minutes. In another example, the server communication module 126 may determine that for the service provider Verizon®, the timeout interval for the communication channel should be 15 minutes. In one embodiment, the timeout interval for communication channels may be provided by the service provider. For example, the service provider AT&T® may inform the server communication module 126 that the timeout interval for communication channels should be 10 minutes, and the server communication module 126 may update the table accordingly. In another embodiment, the sever communication module 126 may analyze network statistics provided by multiple user devices which use the cellular network associated with a service provider, to determine the timeout interval. For example, as different user devices establish communication channels and these communication channels close or terminate due to inactivity (e.g., due to a lack of data on the communication channel), the different user devices may report network statistics such as periods of inactivity to the server communication module 126 and whether a communication channel timed out or was closed as a result of the periods of inactivity. Based on these reports on the periods of inactivity and communication channel statuses (e.g., closed, terminated, dropped or timed out, active, in use, etc.), the server communication module 126 may be able to determine or calculate the timeout interval for communication channels for the service provider, as discussed below in conjunction with FIG. 5.

In one embodiment, the server communication module 126 may receive a packet (e.g., a keepalive packet) from the client device via the communication channel, within the timeout interval or within a threshold of the timeout interval (e.g., within the last 10 minutes of a 20 minute timeout interval). The server communication module 126 may reset the timeout interval for the communication channel when the server communication module 126 receives the packet. For example, the server communication module 126 may reset a timer that was previously set to the timeout interval (e.g., reset a timer set to 20 minutes).

In another embodiment, the server communication module 126 may not receive the packet (e.g., the keepalive packet) from the client device within the timeout interval. For example, the timeout interval for the communication channel may be 20 minutes and the server communication module 126 may not receive data or packets from the user device 104 for 20 minutes. The server communication module 126 may close the communication channel after the timeout interval has been reached or has expired.

In one embodiment, the digital content providing server 125 may provide an action item list to the user device 104 using the first communication channel. The action item list may include a list of digital media items available for the user device 104 to download, a list of software (e.g., applications) for the user device 104 to download, and/or a list of actions or tasks to be performed by the user device 104 (e.g., update settings, update preferences, etc.).

Although some embodiments of the present disclosure are described with reference to the communication channels which use UDP (e.g., UDP ports), it should be understood that these are merely examples. Other embodiments of the present disclosure may use other protocols for the communication channels (e.g., the transport control protocol (TCP), etc.).

Figure 3:
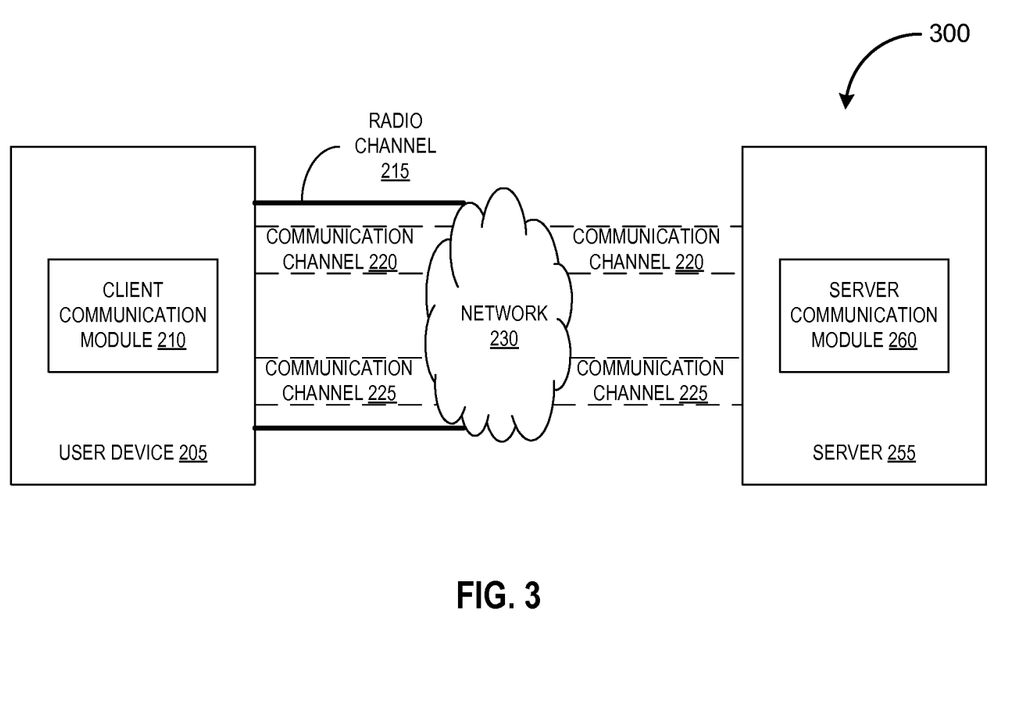
FIG. 3 is a block diagram of a third exemplary network architecture, in which embodiments of the present disclosure may operate.

FIG. 3 is a block diagram of a third exemplary network architecture 300, in which embodiments of the present disclosure may operate. The network architecture 300 includes a user device 205, a radio channel 215, a first communication channel 220, a second communication channel 225, a network 230, and a server 255. The user device 205 includes a client communication module 210. The server 255 includes a server communication module 260. The network 230 may be a cellular communication network (e.g., an LTE network, an HSPA+ network, a CDMA network, etc.). The server 255 may be a digital content providing server (e.g., digital content providing server 125 of FIG. 1) or may be part of a digital content providing system (digital content providing system 120 of FIG. 2).

As shown in FIG. 3, the first communication channel 220 and the second communication channel 225 connect the user device 205 to the server 255 via the network 230. The first communication channel 220 and the second communication channel both use the radio channel 215 (e.g., both use the same radio link) to connect to the server 255 via the network 230. The radio channel 215 may be a cellular communication channel such as a CDMA radio channel, a GSM radio channel, a wideband CDMA (WCDMA) radio channel, etc. Although FIG. 2 shows that the first communication channel 220 and the second communication channel 225 connect to the server 255, in other embodiments, the first communication channel 220 and the second communication 225 may each connect to different servers (e.g., first communication channel 220 may connect to server 225 and second communication channel 225 may connect to another server, as illustrated in FIG. 1).

Figure 4:
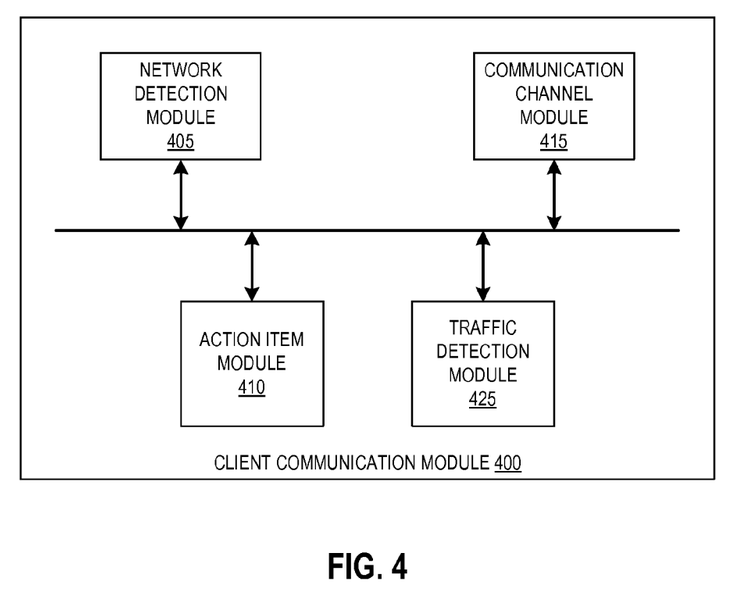
FIG. 4 is a block diagram illustrating a client communication module, according to one embodiment.

FIG. 4 is a block diagram illustrating a client communication module 400, according to one embodiment. The client communication module 400 may be included in a user device or client device (e.g., user device 104 of FIG. 1). The client communication module 400 includes a network detection module 405, an action item module 410, a communication channel module 415, and a traffic detection module 425. More or less components may be included in the client communication module 400 without loss of generality.

In one embodiment, the network detection module 405 may determine whether a user device is able to communicate with a WiFi network. For example, the network detection module 405 may search or scan for radio signals transmitted or broadcasted by a WiFi network or a WiFi network access point, such as a router or switch. The network detection module 405 may also identify a service provider associated with a cellular network. For example, the network detection module 405 may analyze radio signals or messages transmitted or broadcasted by the cellular network to identify the service provider associated with the cellular network.

In one embodiment, the communication channel module 415 may establish a communication channel (e.g., a UDP based communication channel) with a server (e.g., a digital content providing server or a digital content providing system) using a cellular network when the network detection module 405 determines that the user device is unable to communicate with a WiFi network. The communication channel module 415 may establish the communication channel when the user device powers up, when the user device loses connection with a WiFi network, when the user device resumes normal operation from a suspended state, a sleep state, or a reduced power state, or when the user device transmits or receives other data using another communication channel (e.g., uses or transfer data via a second communication channel). In one embodiment, the communication channel module 415 may establish the communication channel with the server when the user device is communicating with the cellular network on another communication channel (e.g., when the user device is already using a wireless modem to transmit or receive data). The communication channel may be used to receive notifications from the server and to receive an action item list from the server. The communication channel module 415 may obtain a timeout interval (e.g., a timeout value) for the communication channel. In one embodiment, the communication channel module 415 may obtain the timeout interval from the server (e.g., the server may transmit a message to the user device indicating the timeout value for the communication channel). In another embodiment, the communication channel module 415 may obtain the timeout interval from the cellular network (e.g., the service provider associated with the cellular network may transmit a message indicating the timeout value for the communication channel).

In one embodiment, the traffic detection module 425 may determine whether the user device is transmitting or receiving data on another channel (e.g., on a second channel). For example, the traffic detection module 425 may determine whether a wireless modem on the user device is powered up or is currently transmitting or receiving radio signals from the cellular network (e.g., whether the wireless modem is currently communicating with a cellular tower, such as a NodeB).

Referring back to the communication channel module 415, the communication channel module 415 may determine whether the user device is transmitting or receiving data on another channel using the traffic detection module 425. In one embodiment, when the communication channel module 415 determines that the user device is transmitting or receiving data on the other channel (e.g., the wireless modem is powered up, is transmitting or receiving radio signals, etc.), the communication channel module 415 may transmit a packet (e.g., a data packet or a keepalive packet) to the server if the user device is transmitting or receiving data on the other channel within or during the timeout interval. For example, if the timeout interval is 20 minutes for the communication channel, then the communication channel module 415 may opportunistically transmit the packet when the user device is transmitting or receiving data on the other channel within the 20 minute timeout interval (e.g., before a timer, set to 20 minute, expires). In one embodiment, the communication channel module 415 may transmit the packet when the user device is transmitting or receiving data on the other channel within a threshold of the expiration of the timeout interval. For example, if the timeout interval is 15 minutes, and the threshold is 5 minutes, the communication channel module 415 may transmit the packet when the user device is transmitting or receiving data on the other channel within the last 5 minutes of the 15 minute timeout interval.

In one embodiment, the communication channel module 415 may reset the timeout interval after the packet (e.g., the keepalive packet) is transmitted to the server. For example, if the timeout interval is 10 minutes, and the packet is sent after 8 minutes of the 10 minute timeout interval has passed (e.g., there are 2 minutes left on the timer), the timeout interval may be reset to the full 10 minute interval (e.g., the timer may be reset back to 10 minutes). In another embodiment, the communication channel module 415 may not be able to transmit a packet within the timeout interval because the user device is not transmitting or receiving data on the other channel within the timeout interval. The communication channel module 415 may terminate or close the communication is the communication channel module 415 is unable to send a packet (e.g., send the keepalive packet) within the timeout interval.

In one embodiment, the action item module 410 may receive a notification from the server via the communication channel. The notification may indicate that the user device should obtain an action item list from the server. The action item module 410 may obtain the action item list from the server, based on the notification received via the communication channel. The action item list may include a digital media item for the user device to download, software (e.g., an application) for the user device to download, and/or an action/task for the user device to perform. The action item module 410 may perform the items in the action item list (e.g., may download a digital media item, may download an application, may update a preference or configuration parameter (such as screen brightness, power settings, network settings, etc.) on the user device, etc.).

Figure 5:
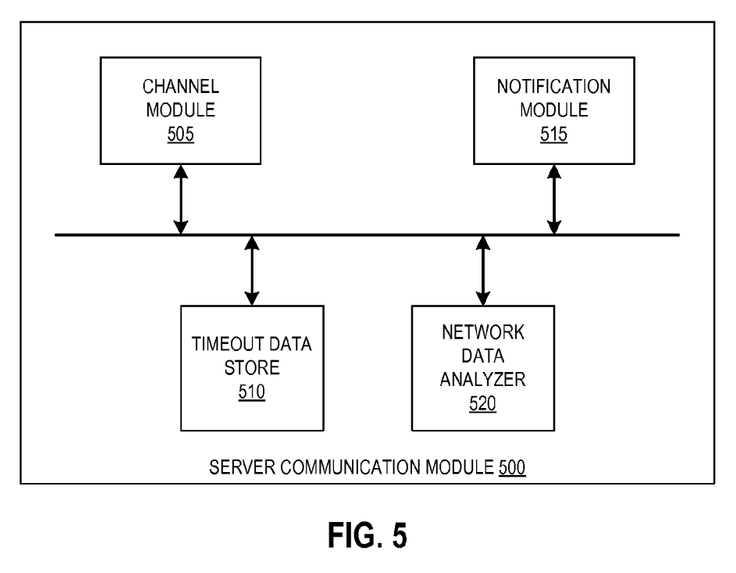
FIG. 5 is a block diagram illustrating a server communication module, according to one embodiment.

FIG. 5 is a block diagram illustrating a server communication module 500, according to one embodiment. The server communication module 500 may be included in a server computer or a server device (e.g., a notification server that sends updates, messages, and/or notifications, the digital content providing server 125 of FIG. 1). The client communication module 500 includes a channel module 505, a timeout data store 510, a notification module 515, and a network data analyzer 520. More or less components may be included in the server communication module 500 without loss of generality.

In one embodiment, the channel module 505 may receive a request to establish a communication channel with a user device. The communication channel may use a cellular network (e.g., an LTE network, an HSPA network, a WiMAX network). The channel module 505 may also receive data indicative of a service provider associated with the cellular network (e.g., AT&T®, Verizon®, etc.). The channel module 505 may access timeout data store 510 to determine a timeout interval for the communication channel based on the data indicative of the service provider. The channel module 505 may provide this timeout interval to the user device.

In one embodiment, the timeout data store 510 may include data indicative of different timeout intervals for different service providers associated with different cellular networks. For example, the timeout data store 510 may include data indicating that a communication channel using Verizon's cellular network should have a timeout interval of 20 minutes, and a communication channel using AT&T's cellular network should have a timeout interval of 15 minutes, etc. In one embodiment, timeout data store 510 may be memory, a file system, a disk drive, a database or other data management layer resident on a data storage device such as a disk drive, RAM, ROM, database, etc.

Referring back to the channel module 505, in one embodiment, the channel module 505 may receive a packet from a user device (e.g., a keepalive packet) via the communication channel. When the channel module 505 receives the packet, the channel module 505 may reset the timeout interval for the communication channel (e.g., may reset a timer). For example, if the timeout interval for the communication channel is 10 minutes (e.g., the communication channel times out if the communication channel is not used for 10 minutes or longer), and after 8 minutes of inactivity (e.g., 2 minutes remain on the timer before the communication channel times out or is closed) a packet is received from the user device, the channel module 505 may reset the timeout interval back to 10 minutes (e.g., may reset the timeout interval back to 10 minutes). When the channel module 505 does not receive a packet for the communication channel within the timeout interval, the channel module 505 may terminate or close the communication channel (e.g., the communication channel times out).

In one embodiment, the notification module 515 may transmit a notification to the user device to indicate that an electronic media item is available for the user device, software is available for the user device, or that the user device should perform some action. In response to the notification, the notification module 515 may receive a request for an action item list from the user device. The notification module 515 may provide the action item list to the user device. The action item list may include a list of digital media items for the device, a list of software for the device, and/or a list of actions for the device to perform. In another embodiment, if the communication channel times out (e.g., is closed or terminated), the notification module 515 may use another communication method (e.g., may use SMS or MMS messages) to provide notifications to user devices.

In one embodiment, the network data analyzer 520 may receive data from multiple user devices which have used or are currently using a cellular network. The data (e.g., the network statistics) may indicate periods of inactivity for the user devices and whether a communication channel was closed or terminated after the periods of inactivity. The network data analyzer 520 may determine the timeout interval for communication channels using the cellular network, based on the data or network statistics received from the multiple user devices. For example, a first user device may indicate that it did not use a communication channel for 9 minutes and the communication channel was not closed or terminated by a cellular network (e.g., AT&T®). A second user device may indicate that it did not use the communication channel for 11 minutes and the communication channel was closed by the cellular network. The network data analyzer 520 may determine that the timeout interval for communication channels using AT&T's cellular network should be 10 minutes. The network data analyzer 520 may store this timeout interval information in the timeout data store 510. In one embodiment, the network data analyzer 520 may receive the timeout interval directly from the service provider associated with the cellular network. For example, the service provider may send a message to the network data analyzer 520 with the timeout interval.

Figure 6:
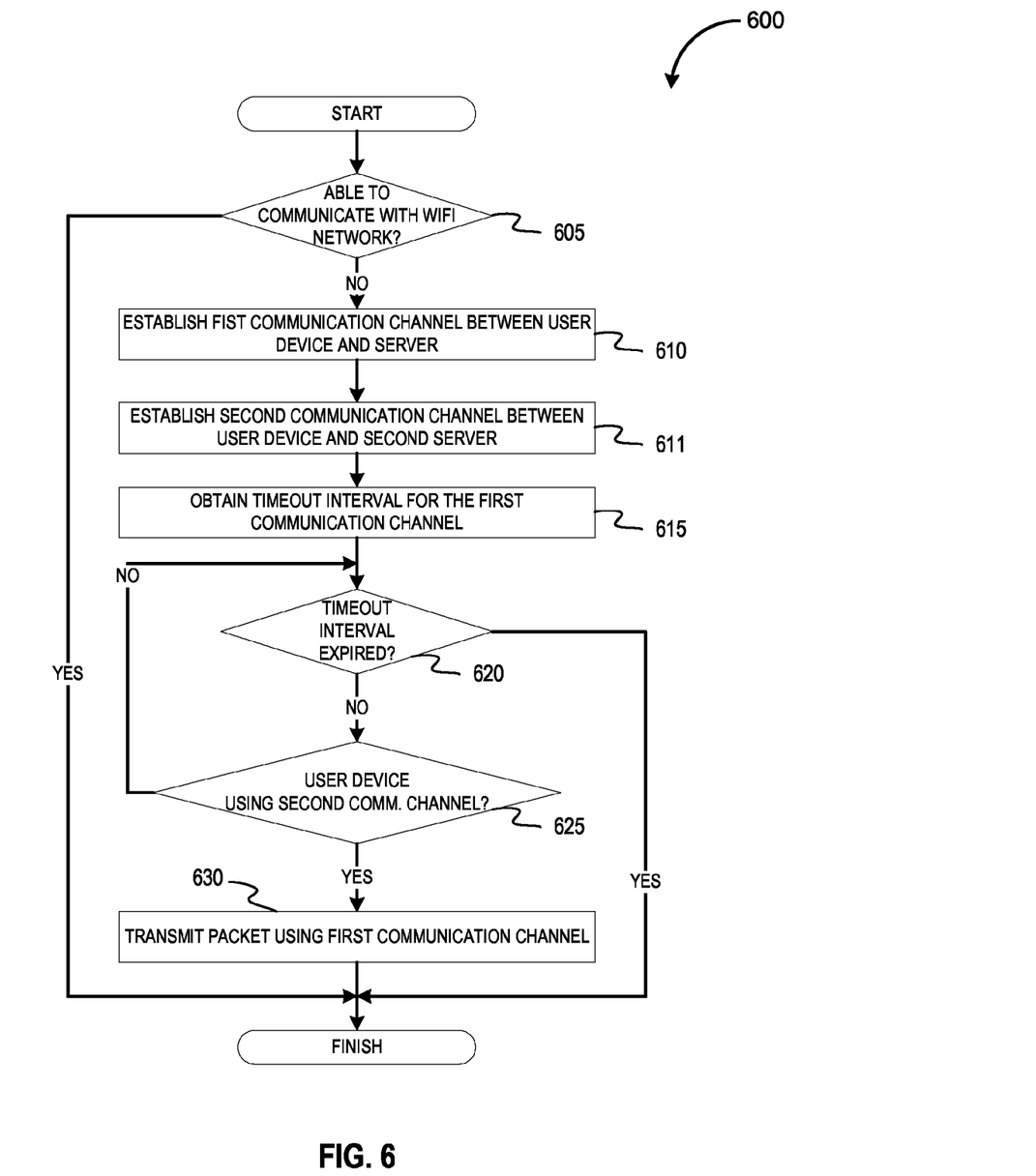
FIG. 6 is a flow diagram illustrating a method for maintaining a communication channel, according to an embodiment.

FIG. 6 is a flow diagram 600 illustrating a method for maintaining a communication channel, according to an embodiment. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to maintain a communication channel. In one embodiment, method 400 may be performed by a client communication module, as shown in FIGS. 1, 2, 3, and 4.

Referring to FIG. 6, the method 600 starts at block 605 where the method 600 determines whether a user device is able to communicate with a WiFi network (e.g., 802.11a, 802.11b, 802.11g, 802.11n, 802.11ac networks). If the user device is able to communicate with the WiFi network, the method 600 ends. If the user device is not able to communicate with the WiFi network, the method proceeds to block 610 where the method 600 establishes a first communication channel between the user device and the server (e.g., a notification server that provides notifications, updates, or other information to the user device) using a cellular network (e.g., an LTE network). At block 611, the method 600 establishes a second communication channel between the user device and a second server (e.g., a content server that hosts a website, digital media, etc.). At block 615, the method 600 obtains the timeout interval for the first communication channel. At block 620, the method 600 determines whether the timeout interval has expired (e.g., determines whether a timer, set to the timeout interval, has expired). If the timeout interval has expired, the method 600 ends. If the time interval has not expired, the method 600 proceeds to block 625, where the method 600 determines whether the user device is using the second communication channel (e.g., whether there is activity such as transferring, transmitting or receiving data). If the user device is not using the second communication channel (e.g., is not transmitting or receiving data), the method 600 proceeds back to block 620. If the user device is using the second communication channel, the method 600 proceeds to block 630 where the method 600 transmits a packet (e.g., opportunistically transmit a keepalive packet) to the server. The packet may cause the first communication channel to be kept alive (e.g., may prevent the first communication from timing out, terminating, or closing).

In one embodiment, the method 600 may not perform block 605, and may perform block 610 through 630 for a WiFi network. For example, instead of establishing the first and second communications channels using a cellular network (blocks 610 and 611), the method 600 may setup establish the first and second communication channels using a WiFi network (e.g., an 802.11n network). The method 600 may also determine whether the user device is using the second communication channel (which uses the WiFi network) before the timeout interval expires (e.g., before a timer set to the timeout interval expires) and may transmit the packet (e.g., keepalive packet) using the first communication channel (which also uses the WiFi network) at blocks 620 through 630.

Figure 7:
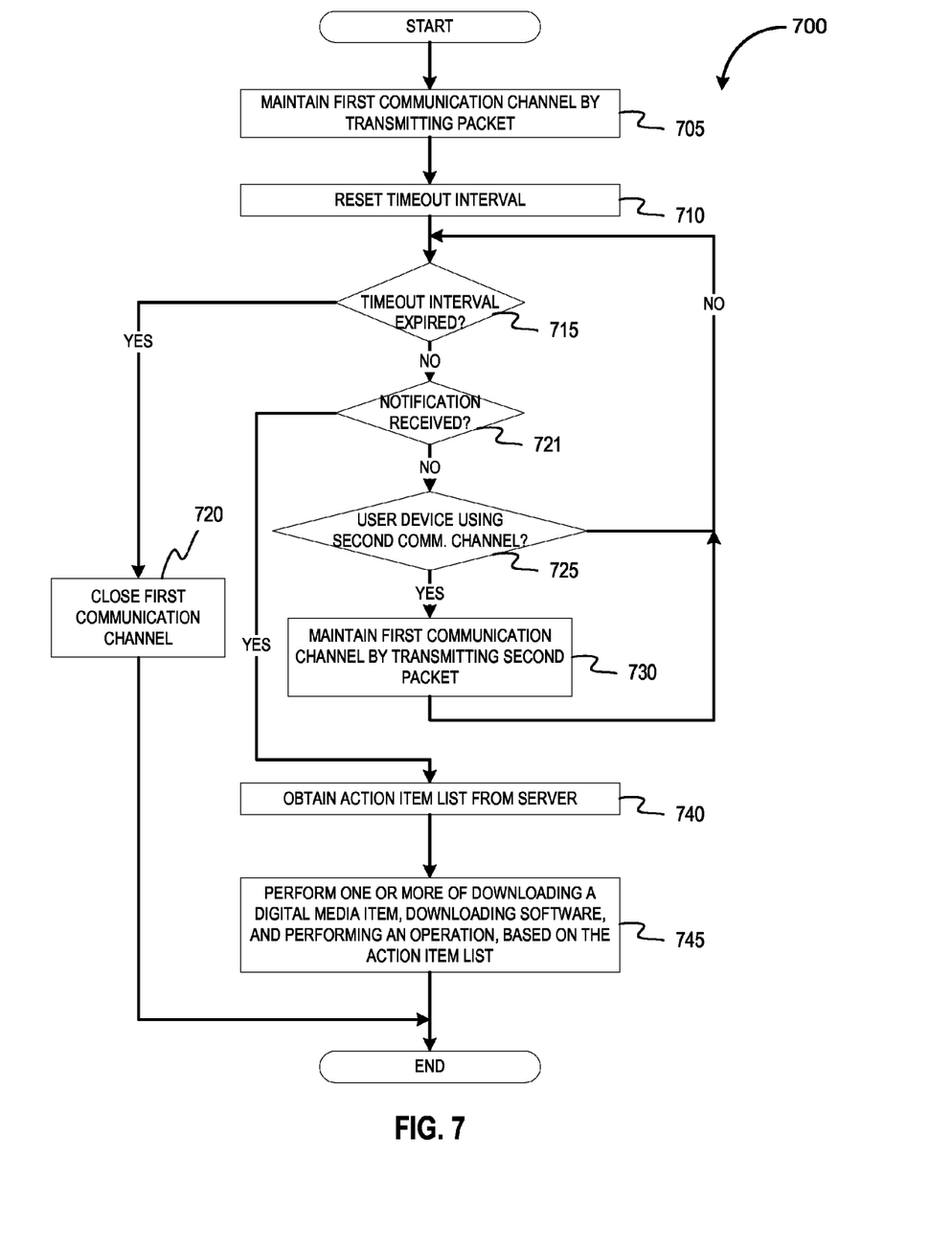
FIG. 7 is a flow diagram illustrating a method for maintaining a communication channel, according to another embodiment.

FIG. 7 is a flow diagram 700 illustrating a method for maintaining a communication channel, according to another embodiment. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to maintain a communication channel. In one embodiment, method 700 may be performed by a client communication module, as shown in FIGS. 1, 2, 3, and 4. In one embodiment, the method 700 may be performed after a packet (e.g., a keepalive packet) is sent to a server. For example, the method 700 may be performed after block 630 of FIG. 6.

Referring to FIG. 7, the method 700 starts at block 705 where the method transmits a packet (e.g., a keepalive packet) to maintain the first communication channel (e.g., to prevent the first communication channel from closing, terminating or timing out). At block 710, the method 700 resets the timeout interval. For example, the method 700 may reset the timeout interval by resetting a timer that was previously set to the timeout interval (e.g., reset a timer that was previously set to 10 minutes). At block 715, the method 700 determines whether the timeout interval has expired. For example, the method 700 may determine whether a timer set to the timeout interval (e.g., a timer set to 20 minutes) has expired. If the timeout interval has expired, the method 700 closes the first communication channel at block 720 and the method 700 ends. If the timeout interval has not expired, the method 700 proceeds to block 721 where the method 700 determines whether a notification has been received. If a notification has not been received, the method 700 proceeds to block 725 where the method 700 determines whether the user device is using the second communication channel (e.g., whether the user device is communicating data, transferring data, transmitting or receiving data using the second communication channel). If the user device is not using the second communication channel, the method 700 proceeds to block 715. If the user device is using the second communication channel, the method 700 proceeds to block 730 where the method 700 maintains the first communication channel by transmitting a second packet (e.g., a second keepalive packet). After maintaining the first communication channel, the method 700 proceeds back to block 715.

Referring back to block 721, if a notification has been received, the method 700 proceeds to block 740, where the method 700 obtains an action item list from the server. At block 745, the method 700 performs one or more of downloading a digital media item, downloading software, and performing an operation on the user device, based on the action item list. After block 745, the method 700 ends.

Figure 8:
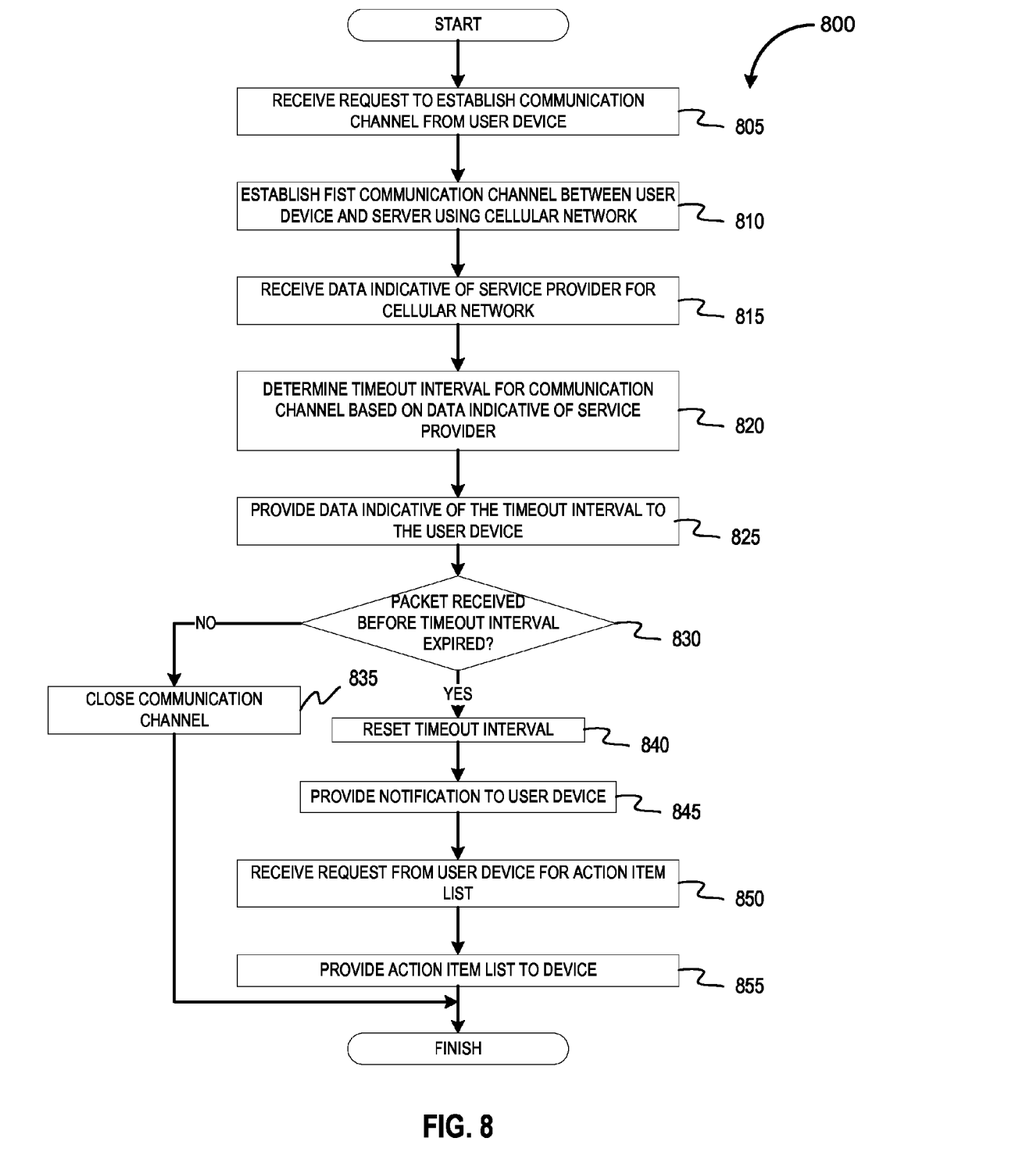
FIG. 8 is a flow diagram illustrating a method for maintaining a communication channel, according to a further embodiment.

FIG. 8 is a flow diagram illustrating a method for maintaining a communication channel, according to a further embodiment. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to maintain a communication channel. In one embodiment, method 800 may be performed by a server communication module, as shown in FIGS. 1, 2, 3, and 5.

Referring to FIG. 8, the method 800 starts by receiving a request to establish a communication channel from a user device at block 805. At block 810, the method 800 establishes the communication channel between a server and the user device using a cellular network. At block 815, the method 800 receives data indicative of a service provider associated with the cellular network. At block 820, the method 800 determines a timeout interval for the communication channel based on the data indicative of the service provider. At block 825, the method 800 provides data indicative of the timeout interval to the user device. At block 830, the method 800 determines whether a packet (e.g., a keepalive packet) was received before the expiration of the timeout interval (e.g., before a timer, set to the timeout interval, expires). If no packet was received before the expiration of the timeout interval, the method 800 closes the communication channel at block 835. If a packet was received before the expiration of the timeout interval, the method 800 resets the timeout interval at block 840 (e.g., resets the timer). At block 845, the method 800 provides a notification to the user device. At block 850 the method 800 receives a request from the user device for an action item list. At block 855, the method 800 provides the action item list to the user device. In one embodiment, block 845 through 855 may be performed a later time, even if a packet is not received before the timeout interval expires. For example, the method 800 may provide the notification to the user device using an SMS or MMS message, instead of using the communication channel. In another example, the blocks 845 through 855 may be performed after another communication channel is setup between the user device and the server.

Figure 9:
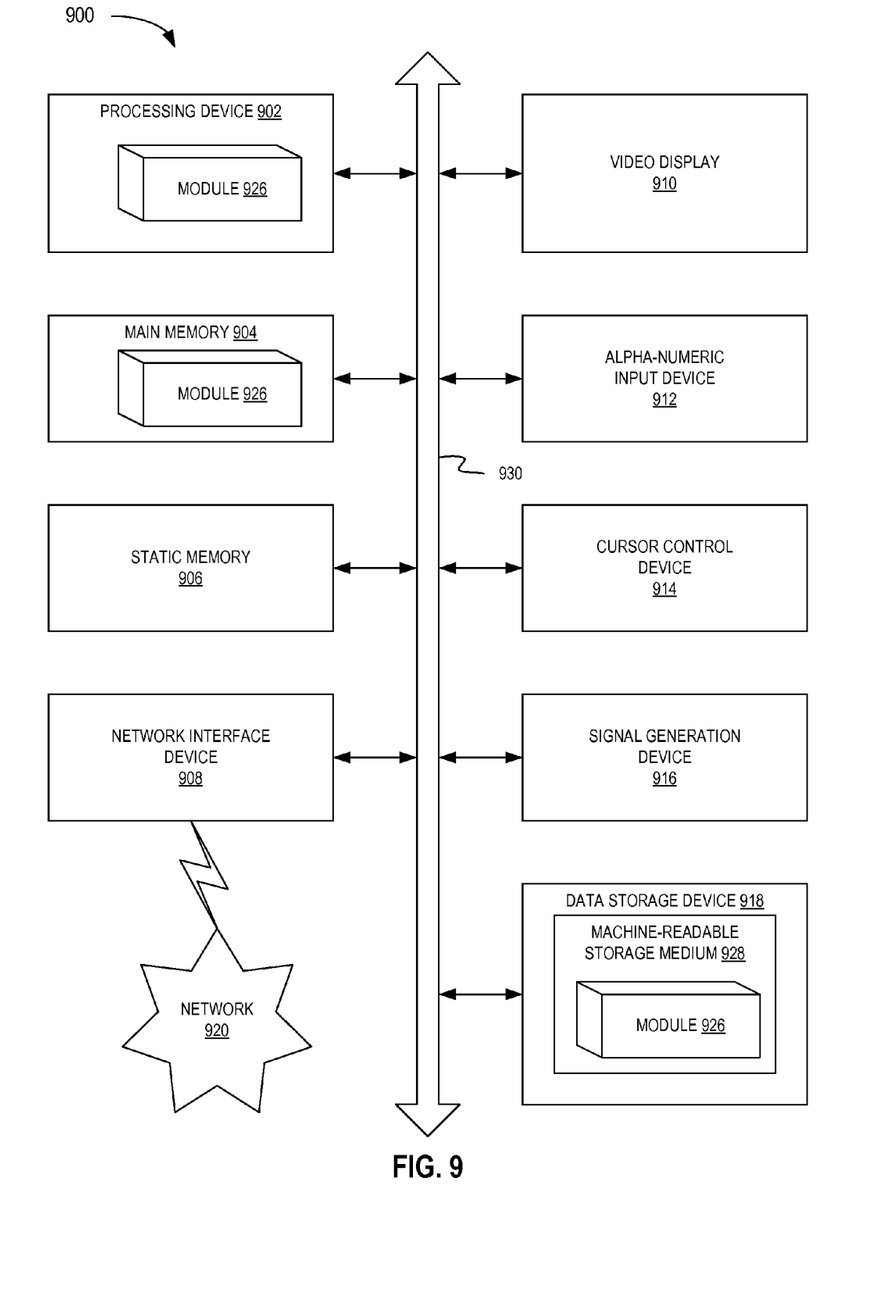
FIG. 9 is a block diagram illustrating one embodiment of a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (e.g., a processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the module 926 (e.g., a client communication module or a server communication module) for performing the operations and steps discussed herein.

The computer system 900 may further include a network interface device 908 which may communicate with a network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions (e.g., instructions of module 926, such as a client communication module or a server communication module) embodying any one or more of the methodologies or functions described herein. The module 926 may also reside, completely or at least partially, within the main memory 904 and/or within the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "establishing," "identifying," "providing," "receiving," "generating," "maintaining," "calculating," "resuming," "losing," "providing," "transmitting," "resetting," "closing," "downloading," "performing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
establishing a first communication channel between a client device and a notification server, wherein the first communication channel uses a cellular network;
establishing a second communication channel between the client device and a content server, wherein the second communication channel uses the cellular network;
identifying a cellular network service provider;
transmitting data indicative of the cellular network service provider to the notification server;
receiving information indicative of a timeout interval from the notification server via the first communication channel, wherein the timeout interval is based on the cellular network service provider and is indicative of a time period before one or more of the client device or the cellular network service provider closes the first communication channel;
setting a timer for the first communication channel based on the timeout interval;
before an expiration of the timer, detecting that data is being transferred via the second communication channel; and
upon detecting that data is being transferred via the second communication channel, transmitting a packet to the notification server via the first communication channel to prevent the first communication channel from being closed.

2. The method of claim 1, further comprising:
resetting the timer upon transmitting of the packet to the notification server via the first communication channel.

3. The method of claim 1, further comprising:
receiving, from the notification server via the first communication channel, a notification pertaining to an action item list, wherein the action item lists comprises information indicative of one or more pending tasks to be performed by the client device;
downloading the action item list, from the notification server, based on the notification; and
performing at least one task based on the action item list.

4. The method of claim 1, wherein transmitting the packet comprises:
transmitting the packet to the server via the first communication channel within a threshold of the expiration of the timer if data is being transferred via the second communication channel.

5. A client device comprising:
a processing device configured to:
establish a first communication channel with a first server using a cellular network;
establish a second communication channel with a second server using the cellular network;
identify the service provider for the cellular network;
transmit data indicative of the service provider to the first server;
receive information indicative of the timeout interval from the first server via the first communication channel, wherein the timeout interval is based on the service provider for the cellular network and is indicative of a time period at which one or more of the client device or the service provider closes the first communication channel;
set a timer for the first communication channel based at least in part on the timeout interval;
determine, before an expiration of the timer, that data is being transferred via the second communication channel; and upon determining that data is being transferred via the second communication channel before the expiration of the timer, transmit a packet via the first communication channel.

6. The client device of claim 5, wherein the processing device is further configured to:
upon determining that data has not been transferred via the second communication channel from a start of the timer until the expiration of the timer, close the first communication channel.

7. The client device of claim 5, wherein the processing device is further configured to:
reset the timer based on the transmitting of the packet via the first communication channel.

8. The client device of claim 5, wherein the first communication channel is established during one or more of:
when the client devices is turned on;
when the client devices resumes operation from a suspended state;
when the client device loses communication with a WiFi network; or
when the client device establishes the second communication channel.

9. The client device of claim 5, wherein the processing device is further configured to:
receive, via the first communication channel, a notification pertaining to an action item list, wherein the action item lists comprises information indicative of one or more pending tasks to be performed by the client device;
download the action item list based on the notification; and
perform at least one task based on the action item list.

10. The client device of claim 9, wherein the at least one task comprises one or more of:
downloading an electronic media item;
downloading software; or
changing a configuration parameter on the client device.

11. The client device of claim 5, wherein transmitting the packet comprises:
transmitting the packet via the first communication channel when the client device is transmitting data on the second communication channel within a threshold of the expiration of the timer.

12. The client device of claim 5, wherein the first communication channel and the second communication channel use a single radio link.

13. The client device of claim 5, wherein the first communication channel and the second communication channel uses multiple radio links.

14. A non-transitory computer-readable storage medium storing instructions which, when executed, cause a processing device to perform a method comprising:
receiving, from a client device, a request to establish a communication channel
establishing the communication channel with the client device wherein the communication channel uses a cellular network;
receiving information indicative of a service provider for the cellular network;
determining a timeout interval for the communication channel based on the information indicative of the service provider, wherein the timeout interval is based on network statistics received from other client devices that have used the cellular network;
setting a timer based on the timeout interval;
providing information indicative of the timeout interval for the communication channel to the client device via the communication channel;
making a determination, before the timer expires, that data is being transferred via the communication channel as a result of the client device detecting that data is being transferred via another communication channel established between the client device and a content server; and
resetting the timer responsive to the determination.

15. The non-transitory computer-readable storage medium of claim 14, wherein the method further comprises:
closing the communication channel when the timer expires.

16. The non-transitory computer-readable storage medium of claim 14, wherein the method further comprises:
providing, to the client device using the communication channel, a notification pertaining to an action item list, wherein the action item lists comprises information indicative of one or more pending tasks to be performed by the client device;
receiving a second request from the client device for the action item list in response to the notification; and
providing the action item list to the client device.

17. The non-transitory computer-readable storage medium of claim 14, wherein the network statistics comprise information indicative of periods of inactivity on one or more communication channels and statuses of the one or more communication channels during the periods of inactivity.

* * * * *